US012641081B2

(12) United States Patent     (10) Patent No.:   US 12,641,081 B2

Barnes et al.     (45) Date of Patent:     May 26, 2026

(54) FAST JOINS AND LOW MEMORY USAGE FOR END-TO-END (E2E)-SECURE APPLICATIONS USING LIGHT MLS CLIENTS

(71) Applicant: Cisco Technology, Inc., San Jose, CA (US)

(72) Inventors: Richard Lee Barnes, Arlington, VA (US); Suhas Nandakumar, Milpitas, CA (US); Gregory Lee Hewett, Plano, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 61 days.

(21) Appl. No.: 18/627,845

(22) Filed: Apr. 5, 2024

(65) Prior Publication Data

US 2025/0247390 A1     Jul. 31, 2025

Related U.S. Application Data

(60) Provisional application No. 63/625,347, filed on Jan. 26, 2024.

(51) Int. Cl.
    *H04L 9/40*     (2022.01)

(52) U.S. Cl.
    CPC ........ *H04L 63/0876* (2013.01); *H04L 63/102* (2013.01); *H04L 63/166* (2013.01)

(58) Field of Classification Search
    None
    See application file for complete search history.

(56) References Cited

U.S. PATENT DOCUMENTS

| | | | |
|---|---|---|---|
| 8,254,287 B2 * | 8/2012 | Jayaram | H04L 67/1046 370/254 |
| 2004/0030787 A1 | 2/2004 | Jandel et al. | |
| 2006/0133390 A1 * | 6/2006 | Sreekantiah | H04L 45/033 370/401 |
| 2008/0288365 A1 * | 11/2008 | Fisher, III | G06Q 30/06 705/26.8 |
| 2009/0138584 A1 * | 5/2009 | Choi | H04L 67/1051 709/223 |
| 2009/0310518 A1 * | 12/2009 | Jayaram | H04L 67/104 370/254 |

(Continued)

OTHER PUBLICATIONS

Barnes R., et al., "RFC 9420 The Messaging Layer Security (MLS) Protocol", Internet Engineering Task Force (IETF), Standards Track, Jul. 2023, 132 Pages.

(Continued)

*Primary Examiner* — Michael W Chao

(74) *Attorney, Agent, or Firm* — Edell, Shapiro & Finnan, LLC

(57) ABSTRACT

A user device joins a communication session between the user device and a plurality of devices. The user device and the plurality of devices use a Message Layer Security (MLS) protocol for end-to-end security. The user device identifies a first device of the plurality of devices and obtains a portion of authentication tree information associated with the communication session. The portion being associated with the first device. The user device authenticates the first device based on obtaining the portion of the authentication tree information.

20 Claims, 10 Drawing Sheets

(56)            References Cited

U.S. PATENT DOCUMENTS

| | | | |
|---|---|---|---|
| 2011/0128889 A1* | 6/2011 | Liao | H04L 45/04 |
| | | | 370/254 |
| 2011/0225311 A1* | 9/2011 | Liu | H04L 45/125 |
| | | | 709/231 |
| 2011/0258270 A1* | 10/2011 | Shin | H04L 67/1046 |
| | | | 709/206 |
| 2021/0021605 A1 | 1/2021 | Innes et al. | |
| 2021/0144213 A1 | 5/2021 | Momchilov et al. | |
| 2022/0182221 A1 | 6/2022 | Wood et al. | |
| 2023/0134598 A1* | 5/2023 | Dillon | H04L 63/0435 |
| | | | 713/176 |
| 2023/0198749 A1 | 6/2023 | Tolba et al. | |
| 2023/0283636 A1 | 9/2023 | Roques et al. | |
| 2024/0064143 A1* | 2/2024 | Raj | H04L 63/0884 |
| 2024/0323013 A1* | 9/2024 | Dillon | H04L 9/0891 |
| 2024/0333695 A1* | 10/2024 | Stolbikov | H04L 9/3263 |

OTHER PUBLICATIONS

Perrin T., et al., "The Double Ratchet Algorithm", Revision 1, Nov. 20, 2016, retrieved at https://signal.org/docs/specifications/doubleratchet/, 34 Pages.

* cited by examiner

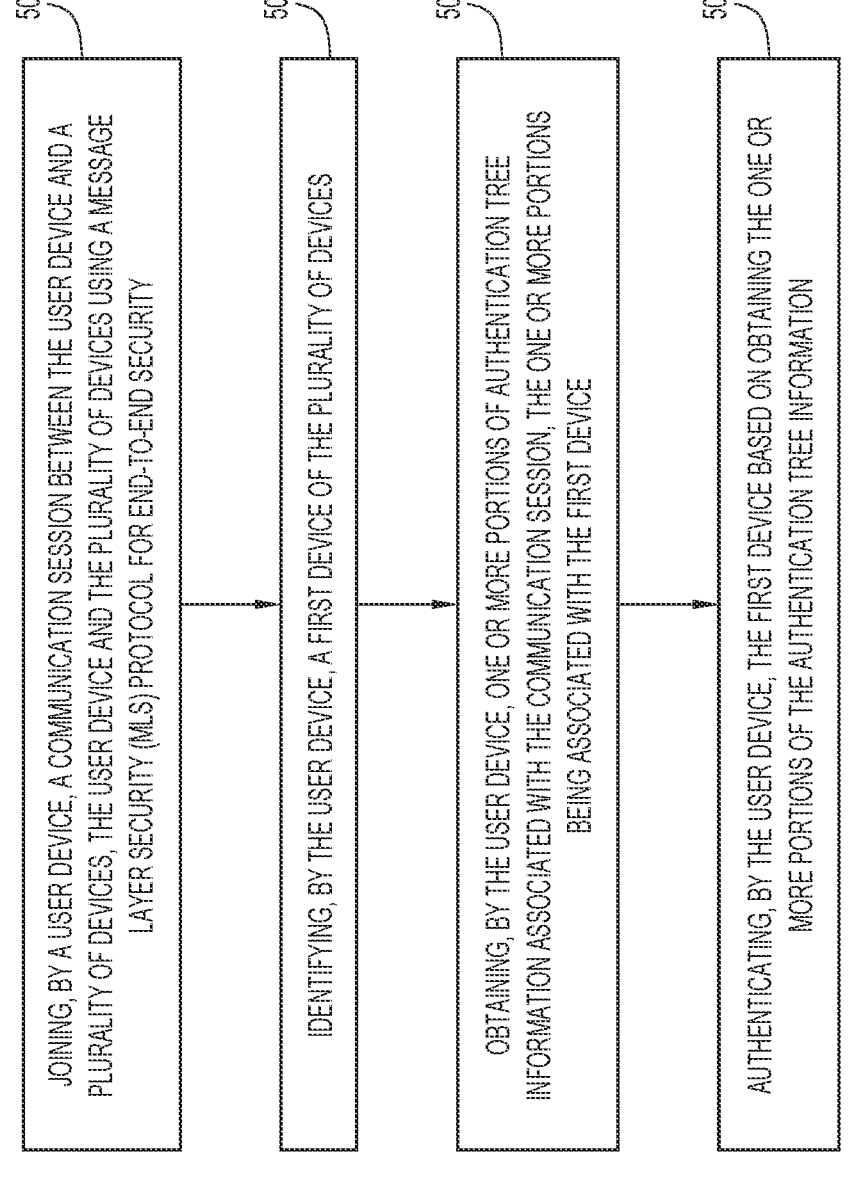

JOINING, BY A USER DEVICE, A COMMUNICATION SESSION BETWEEN THE USER DEVICE AND A PLURALITY OF DEVICES, THE USER DEVICE AND THE PLURALITY OF DEVICES USING A MESSAGE LAYER SECURITY (MLS) PROTOCOL FOR END-TO-END SECURITY

504

IDENTIFYING, BY THE USER DEVICE, A FIRST DEVICE OF THE PLURALITY OF DEVICES

506

OBTAINING, BY THE USER DEVICE, ONE OR MORE PORTIONS OF AUTHENTICATION TREE INFORMATION ASSOCIATED WITH THE COMMUNICATION SESSION, THE ONE OR MORE PORTIONS BEING ASSOCIATED WITH THE FIRST DEVICE

508

AUTHENTICATING, BY THE USER DEVICE, THE FIRST DEVICE BASED ON OBTAINING THE ONE OR MORE PORTIONS OF THE AUTHENTICATION TREE INFORMATION

500

FAST JOINS AND LOW MEMORY USAGE FOR END-TO-END (E2E)-SECURE APPLICATIONS USING LIGHT MLS CLIENTS

CROSS REFERENCE TO RELATED APPLICATION

This application claims priority to U.S. Provisional Application No. 63/625,347, filed Jan. 26, 2024, the entirety of which is incorporated herein by reference.

TECHNICAL FIELD

The present disclosure relates to end-to-end secure applications.

BACKGROUND

End-to-end (E2E) encryption refers to mechanisms that allow devices/clients to communicate via a cloud service without the cloud service being able to read or tamper with the communications. The Message Layer Security (MLS) protocol, which is discussed in Request for Comments (RFC) 9420, is the leading protocol for end-to-end security. The MLS protocol allows a group of clients to establish shared secret keys that can be used to encrypt application content. The MLS key exchange process provides a few main security properties, including confidentiality and authenticity. The keys established by MLS are known only to the clients participating in the MLS group. In addition, all clients agree on the set of clients participating in the group, and each device can verify the identity of each other client participating in the group.

BRIEF DESCRIPTION OF THE DRAWINGS

FIG. 5 is a flow diagram illustrating a method of authenticating a device based on obtaining a portion of authentication tree information associated with the device, according to an example embodiment.

DETAILED DESCRIPTION

Overview

Figure 1:
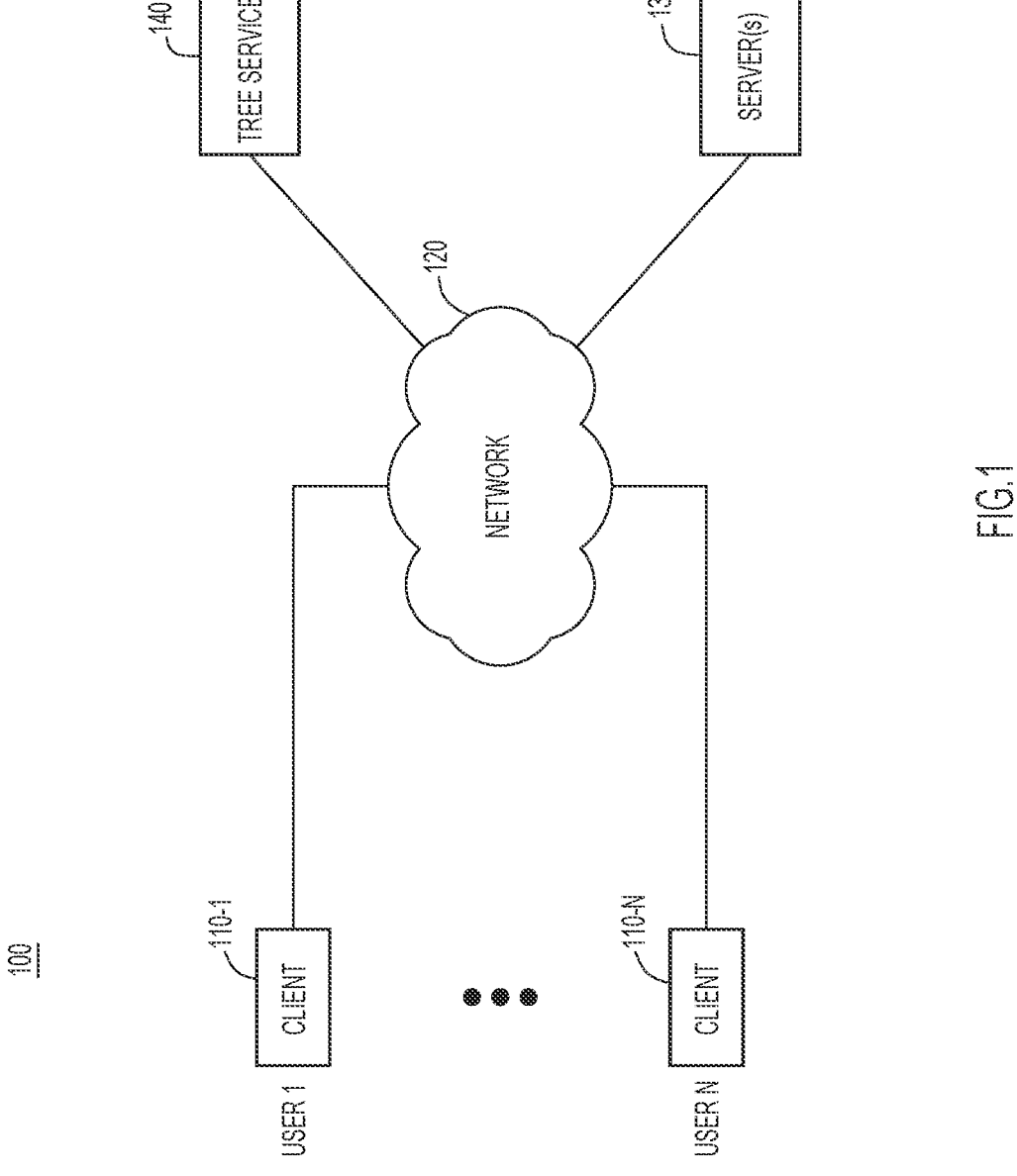
FIG. 1 illustrates a high-level diagram of a system in which the techniques presented herein may be employed, according to an example embodiment.

Presented herein are systems and methods for authenticating a device based on obtaining a portion of an authentication tree associated with the device. The methods involve a user device joining a communication session between the user device and a plurality of devices. The user device and the plurality of devices use the Message Layer Security (MLS) protocol for end-to-end security. The user device identifies a first device of the plurality of devices and obtains one or more portions of authentication tree information associated with the communication session. The one or more portions are associated with the first device. The user device authenticates the first device based on obtaining the portion of the authentication tree information. The user device authenticates additional devices of the plurality of devices by obtaining additional portions of authentication tree information associated with the additional devices. An order in which the devices are authenticated is determined based on a priority scheme.

EXAMPLE EMBODIMENTS

Basic Concepts and Terminology

A "client" represents hardware or software that a user uses to engage in end-to-end secure communications (e.g., also referred to as a "conversation" that may involve an audio/video stream associated with a video conference or audio conference, a messaging space to which users post messages, a digital whiteboard to which users may draw content, or any other streaming content or content technology platform now known or hereinafter developed). The terms client, client device, user device, and end device may be used herein interchangeably.

A client participates in one or more end-to-end secure "conversations." The clients in a conversation use an end-to-end encryption (E2EE) protocol, such as MLS or Double Ratchet to establish keys for E2E encryption. Each conversation has a separate E2EE protocol state. Clients may be added or removed from a conversation over time.

When using MLS-based end-to-end secure communications, all clients/devices in a group (e.g., in a conversation, a messaging space, an online meeting, etc.) agree on the set of clients participating in the group and each device is able to verify the identity of each other client participating in the group. To verify the identity of each other client, an MLS "ratchet tree" is used. The ratchet tree stores cryptographic keys and identity credentials for each device in the group. The size of the ratchet tree scales linearly with the size of the group. With standard MLS, each client downloads the group's ratchet tree when joining the group and maintains a local copy of the ratchet tree as long as the client is in the group.

When the group of communicating clients is large, standard MLS procedures make it slow for a client to join the group and expensive to keep the group state. For example, in an E2E-secure online meeting with several hundreds or thousands of participants, the ratchet tree may consume several megabytes of memory and take more than a minute to download. Research has provided the security of a scheme for "light MLS clients" in which the clients do not need to download the ratchet tree or maintain a local copy of the ratchet tree. In exchange, the light clients do not get authenticity guarantees until the clients download the ratchet tree. The techniques presented herein leverage the concept of light clients to achieve an optical balance between performance and security. The techniques allow clients to instantly join a group of any size, while still getting the authentication information that the client needs.

There are alternative technologies to MLS, such as the Leader Keys scheme and the Sender Keys framework. Both of these technologies have challenges with respect to their authenticity properties.

In the Leader Keys scheme, a joiner is only able to authenticate a single client in the meeting (the "leader"). A joining client thus only needs to download and store information about a single other client. However, the client is unable to authenticate any client other than the leader, much less confirm that they have agreement on the membership of the group.

In the Sender Keys scheme, there is a send/receive asymmetry. To receive a message from a given sender, the sender needs to receive a key from that sender. Thus, if a group is large but has few senders, the cost of joining as a receive-only member is low and on the order of the number of senders. To send a message to the group, a client needs to send its key to every other member of the group. Authentication can be done as part of sending or receiving a key, so a receive-only client will have authentication for the senders it receives from, and a sending client will authenticate everyone (at linear-scale cost). There is no confirmation that the clients agree on the membership.

The techniques presented herein provide both a fast join like the Leader Keys scheme and incremental authentication like the Sender Keys scheme. However, by leveraging MLS and the Light MLS schemes, the techniques presented herein assure clients that the authentication information they receive is consistent with the views of other clients and offer more flexibility in allowing clients to choose which other clients to incrementally authenticate and in what order to incrementally authenticate the other clients.

Reference is now made to FIG. 1, which shows a high-level diagram of a system 100 that includes a plurality of clients 110-1 to 110-N, one or more servers 130 that support a cloud-based application on behalf of the clients, and a tree service 140. Each client 110-1 to 110-N is associated with a user, User 1 to User N. Clients 110-1 to 110-N may communicate with the one or more server(s) 130 or the tree service 140 via a data network (e.g., the Internet) 120. The one or more server(s) 130 may support a cloud-based application, such as an online meeting/video conference application, online messaging application, and other functions.

Tree service 140 provides access to a ratchet tree for a group of users participating in a conversation. For example, if users User 1 to User N are participating in an online meeting or group messaging space using a cloud-based application that uses MLS for end-to-end security, tree service 140 may store the ratchet tree for the users User 1 to User N in the group. The users in the group can obtain or download the ratchet tree from the tree service 140.

Figure 2:
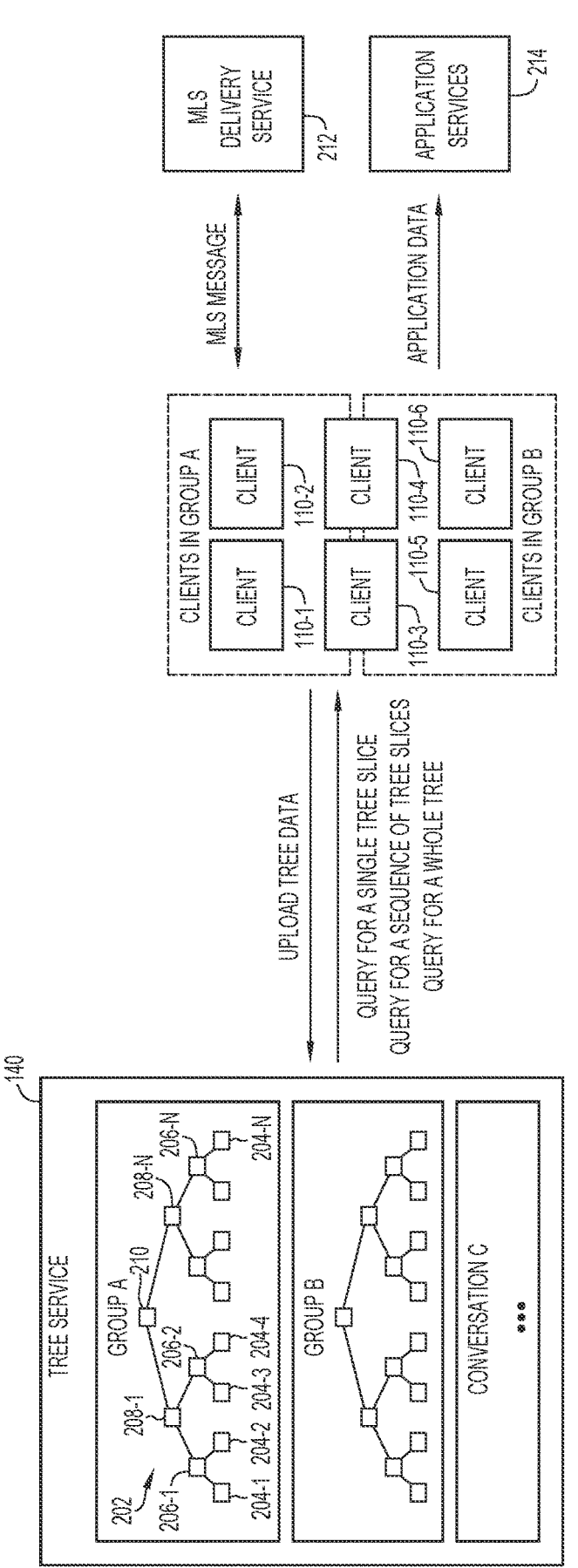
FIG. 2 is a block diagram illustrating how a cloud-based application uses the MLS protocol for end-to-end security, according to an example embodiment.

Reference is now made to FIG. 2. FIG. 2 is a block diagram illustrating how a cloud-based application uses the MLS protocol for end-to-end security. A cloud-based application may provide application services 214 (e.g., online meeting services, conferencing services, online messaging services, etc.) to clients 110-1 to 110-N, which each incorporate an MLS client. The application provides an MLS Delivery Service 212, as specified in the MLS architecture. The MLS Delivery Service 212 plays two major roles in MLS—as a directory service providing the initial keying material for clients to use (which allows a client to establish a shared key and send encrypted messages to other clients even if they are offline), and as a routing service that routes MLS messages among clients. Clients 110-1 to 110-N that are participating in a conversation facilitated by a cloud-based application form MLS groups to provide E2E security to application content using tree service 140 to optimize access to MLS ratchet trees for the groups.

As illustrated in FIG. 2, clients 110-1, 110-2, 110-3, and 110-4 are participating in a first group, Group A. For example, clients 110-1 to 110-4 may be participating in an online meeting or a messaging/conversation space that uses the MLS protocol for end-to-end security. Clients 110-3, 110-4, 110-5, and 110-6 are participating in a second group, Group B. The clients in Group A and Group B have access to tree service 140, which provides access to the ratchet tree for each group. The tree service 140 maintains a copy of each group's ratchet tree. As described further below, tree service 140 offers two interfaces that clients can query for information about the ratchet tree—download the full tree as a single object or download a tree slice for a node/collection of nodes.

FIG. 2 illustrates an example ratchet tree 202 associated with Group A. Ratchet tree 202 includes leaf nodes 204-1 to 204-N. Each leaf node is associated with a user or client in Group A and includes a digital certificate for the user. Parent nodes 206-1 to 206-N include cryptographic key pairs (e.g., a public key and a private key) for the leaf nodes below the parent node. For example, parent node 206-1 includes the key pairs for the users associated with nodes 204-1 and 204-2 and parent node 206-2 includes the key pairs for the users associated with nodes 204-3 and 204-4. Parent nodes 208-1 to 208-N include the key pairs for the nodes below them. For example, parent node 208-1 includes the key pairs of nodes 206-1 and 206-2. Root node 210 includes the key pairs of all nodes (and all users) in ratchet tree 202.

Clients 110-1 to 110-N may upload their tree data to tree service 140. In addition, clients 110-1 to 110-N may query tree service 140 for information about the ratchet tree for their group. When a client joins a conversation for a group, the client downloads the information in the ratchet tree for the group to authenticate the members of the group. The client joins the group as a light client, using the standard procedure for light clients. In particular, when a new client joins the group, another group member adding the new client sends the new client a welcome message. The welcome message does not contain the optional ratchet tree extension, and the client does not attempt to validate the group's ratchet tree before joining. The client does, however, download a tree slice for itself and the group member that sent the welcome, allowing it to verify that the joiner and the welcome sender are both properly members of the group.

Once joined to the group as a light client, the client follows an activation strategy to determine when the client should become a full client. The activation strategies include always-light, as-needed, and lazy-load.

If the client follows the always-light activation strategy, the client joins the group as a light client and never becomes a full client. In this strategy, the client has minimal memory usage, but cannot issue the MLS Commit messages that are required to change the group's membership.

If the client follows the as-needed activation strategy, the client joins as a light client, and becomes a full client only when the cloud-based application requires the MLS client to make a Commit. Then client then returns to being a light client. For example, an application might require an MLS client to make a Commit after joining, or when a new member needs to be added to the group.

If the client follows the lazy-load activation strategy, the client joins as a light client, downloads the ratchet tree to become a full client, and remains a full client until the client leaves the group. When following this activation strategy, the client joins quickly, but takes on the ongoing cost of maintaining a local copy of the ratchet tree.

When following any of the activation strategies, the client downloads the ratchet tree for the group. The client may download the ratchet tree as a single object, as a sequence of slices, or as a sequence of non-overlapping slices (avoiding downloading the same information twice).

For example, a client may download the full ratchet tree as a single object, download a "tree slice" for a collection of leaf nodes, or download tree slices incrementally and sequentially, as a series of individual tree slices, optionally with redundant nodes removed. A tree slice for a leaf node may include the leaf node, the parents/ancestors of the leaf node, and tree hashes for nodes that are the copaths of the leaf node and not listed above.

The leaf nodes 204-1 to 204-N carry the most information and downloading the certificate and related information stored for each leaf node in a large group may take a long time and use a lot of resources. Downloading a full ratchet tree for a large group (e.g., 1000 participants) may take a minute or longer and the client downloading the ratchet tree may be preventing from accessing content associated with the conversation before the entire ratchet tree is downloaded. Therefore, when a client is joining a large group, it may be beneficial to download a tree slice for a collection of leaf nodes or download tree slices for individual leaf nodes incrementally/sequentially.

This tree service may be provided in a distributed manner by the members of the group, with a query for a given slice being answered by a group member who has a copy of that portion of the tree. Alternatively, the tree service may be provided by a server outside the group, either a single physical/logical server or a distributed storage system such as the Interplanetary File System (IPFS).

If the client downloads the tree slices individually and incrementally, a prioritization scheme may be used to determine the order in which to download the individual tree slices associated with individual participants in the conversation. The order of the incremental download may be decided by the client or server.

In one embodiment, the prioritization scheme may be based on the proximity to the client in terms of geolocation. For example, the client may first download the tree slice of a user who is geographically closest to the client. The client may continue downloading the tree slices in the order of the geographically closest participants to the client. In another embodiment, the prioritization scheme may be based on proximity to the client in terms of data caches used by the server.

In another embodiment, the prioritization scheme may be based on membership in an application-level subgroup. For example, if a user is participating in a breakout room or sub-conversation with a group of participants, the client may first download the tree slices of the individuals in the breakout room or sub-conversation. In another embodiment, the prioritization scheme may be based on a position in an application participant list. For example, a client may download tree slices of visible users on the participant list first followed by the tree slices of other users in scrolling order.

In another embodiment, the prioritization scheme may be based on application-level activity. For example, as described further below in FIG. 4, a client may first download tree slices associated with active speakers, recent or predicted active speakers, participants sharing content, participants in the stage of an online communication session, etc. In another embodiment, the prioritization scheme may be based on application-level roles. For example, a client may first download tree slices associated with hosts, co-hosts, panelists, presenters, etc. of an online meeting or communication session.

In some embodiments, these prioritization schemes may be used to select the order in which parts of the tree are downloaded as part of downloading the full tree. In other embodiments, the prioritization schemes may be used to select a subset of the tree to download, irrespective of whether the client intends to become a full client. For example, a video conferencing client might only download tree slices for the active speakers in a meeting, or only for the clients in a breakout room. A client might combine the above prioritization schemes (e.g., downloading a tree slice for the host first, then for the active speakers, etc.).

Figure 3A:
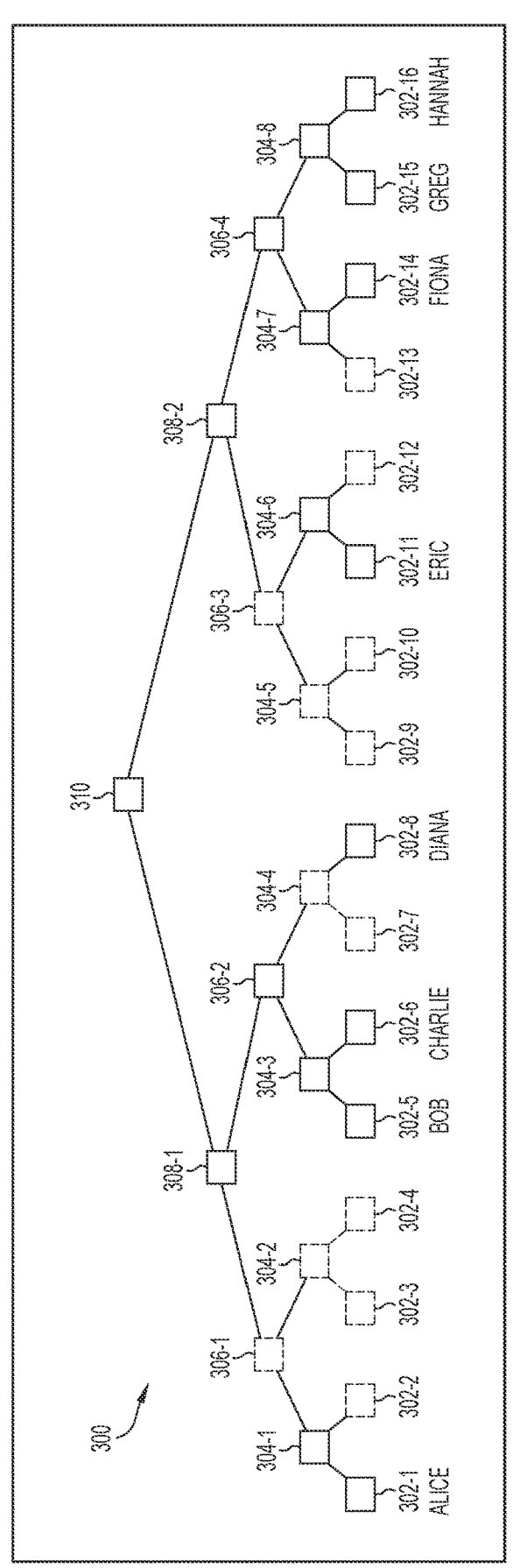
FIG. 3A is a diagram illustrating an MLS ratchet tree for a group associated to a video conference, according to an example embodiment.

Reference is now made to FIGS. 3A-3D. FIGS. 3A-3D show examples of downloading a ratchet tree for a group of eight clients. FIG. 3A shows an example in which the MLS ratchet tree 300 for the entire group of participants is downloaded as a single object.

As illustrated in FIG. 3A, ratchet tree 300 includes leaf node 302-1 associated with user Alice, leaf node 302-5 associated with user Bob, leaf node 302-6 associated with user Charlie, leaf node 302-8 associated with user Diana, leaf node 302-11 associated with user Eric, leaf node 302-14 associated with user Fiona, leaf node 302-15 illustrated with user Greg, and leaf node 302-16 associated with user Hannah. Dashed nodes in ratchet tree 300 are blank nodes that contain no information. Dashed leaf nodes 302-2, 302-3, 302-4, 302-7, 302-9, 302-10, 302-12, and 302-13 are blank nodes that are associated with users who are no longer in the group. For example, a user may join the group and a leaf node on the ratchet tree may be associated with the user. When the user leaves the group, a blank node with no information may remain on the ratchet tree for the group.

Downloading the entire ratchet tree 300 as a single object includes downloading the nodes shown in solid lines. The nodes with dashed lines (e.g., nodes 302-2, 302-3, 302-4, 302-7, 302-9, 302-10, 302-12, 302-13, 304-2, 304-4, 304-5, 306-1, and 306-3) contain no information and are not downloaded. Leaf nodes 302-1, 302-5, 302-6, 302-8, 302-11, 302-14, 302-15, and 302-16 include the digital certificates and additional information associated with the users currently in the group. Nodes 304-1, 304-3, 304-6, 304-7, 304-8, 306-2, 306-4, 308-1, and 308-2 include key pairs for the users associated with the leaf nodes under the nodes. Root node 310 includes the key pairs for all eight of the users in the group.

For a large group (e.g., a group with hundreds or thousands of participants), downloading the entire ratchet tree 300 at one time may take a long time and use a lot of resources. For example, it may take minutes to authenticate everyone in a large meeting and may use a lot of storage. In addition, a user may be able to view any media associated with the meeting before downloading the entire ratchet tree and authenticating every participant. According to techniques presented herein, a user may download a tree slice associated with a few leaf nodes or download a tree slice for each leaf node incrementally while still being able to view media associated with a meeting or conversation.

Figure 3B:
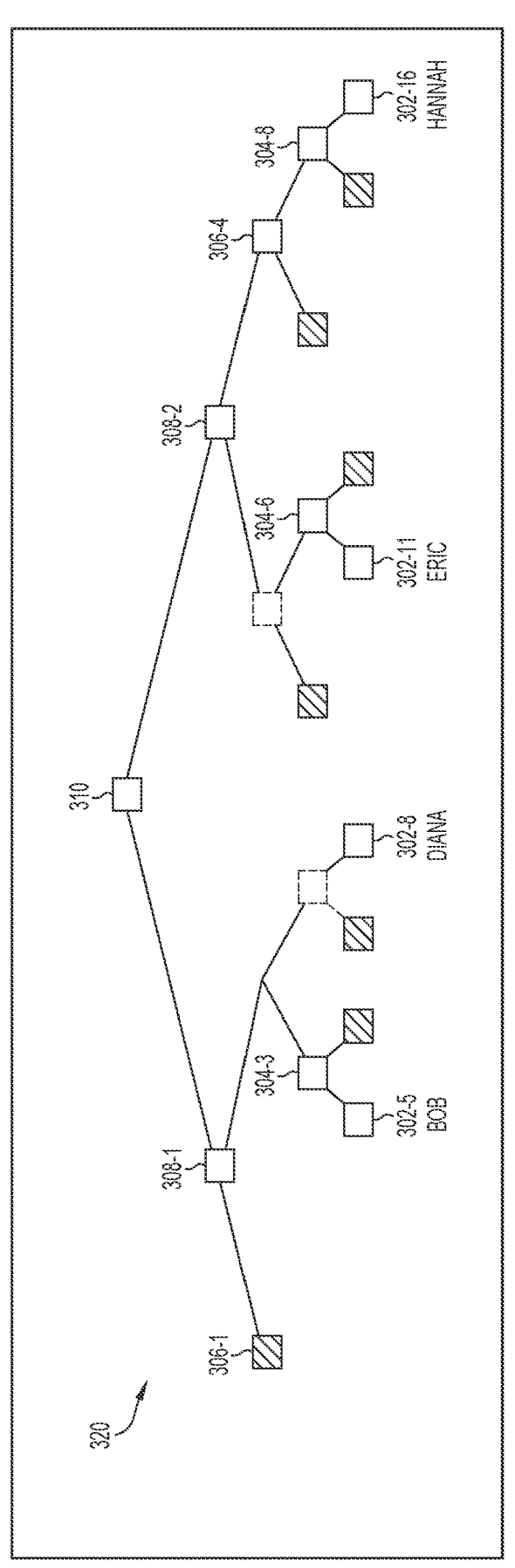
FIG. 3B illustrates an example tree slice of an MLS ratchet tree that includes nodes associated with four users, according to an example embodiment.

FIG. 3B illustrates an example tree slice 320 that includes nodes associated with users Bob, Diana, Eric, and Hannah. A client may download tree slice 320 if, for example, Bob, Diana, Eric, and Hannah are active speakers or presenting content in a conversation. In this way, a client may quickly authenticate the users who are presenting content and be able to view the content without authenticating every user in a group or conversation. In other embodiments, a client may download tree slice 320 if, for example, Bob, Diana, Eric, and Hannah are co-hosts of a meeting or if a user associated with the client is in a breakout room with Bob, Diana, Eric, and Hannah.

In the example illustrated in FIG. 3B, dashed nodes with dashed lines are blank nodes with no information that are not downloaded. The grey nodes are nodes that include cryptographic summaries of the remainder of the ratchet tree. When a client joins a conversation, the client receives the hash of the ratchet tree from another client. The information in the grey boxes may be used to perform incremental verifications and compute the root without receiving the whole ratchet tree. The cryptographic summaries of the missing data in the grey nodes are small and can be used to compute the root without downloading the large amount of information from the remainder of the ratchet tree.

Tree slice 320 includes leaf node 302-5 corresponding to Bob, leaf node 302-8 corresponding to Diana, leaf node 302-11 corresponding to Eric, and leaf node 302-16 corresponding to Hannah. As discussed above, the leaf nodes include the digital certificates associated with the corresponding user as well as additional information.

Nodes 304-3, 304-6, 304-8, 306-1, 308-1, 308-2, and 310 include the key pairs for one or more of Bob, Diana, Eric, and Hannah. These nodes may additionally include key pairs for users other than Bob, Diana, Eric, and Hannah. If a client downloads tree slice 320, the client may download the leaf nodes corresponding to Bob, Diana, Eric, and Hannah as well as the nodes that include the key pairs for these users. The client may additionally download the grey nodes that include the cryptographic summaries of the missing parts of the ratchet tree.

Figure 3C:
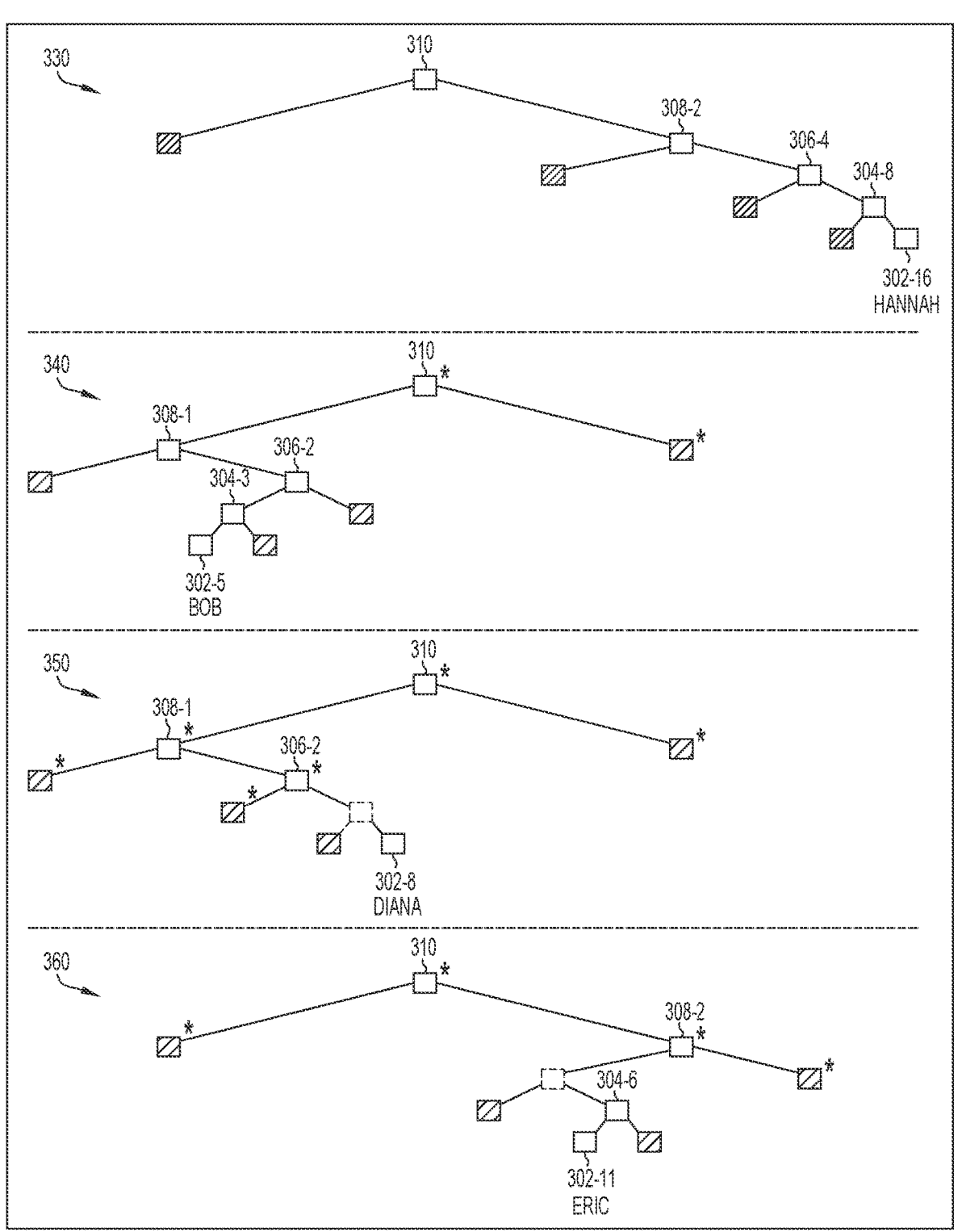
FIG. 3C illustrates four example tree slices corresponding to four different users, according to an example embodiment.

In some situations, instead of downloading the tree slice for a collection of nodes at the same time, a client may download a tree slice for each node individually and incrementally. For example, a user may download a tree slice corresponding to Hannah, download a tree slice corresponding to Bob, download a tree slice corresponding to Diana, and then download a tree slice corresponding to Eric. FIG. 3C illustrates four example tree slices corresponding to four different users. FIG. 3C illustrates tree slice 330 corresponding to Hannah, tree slice 340 corresponding to Bob, tree slice 350 corresponding to Diana, and tree slice 360 corresponding to Eric.

Tree slice 330 includes leaf node 302-16 that includes Hannah's digital certificate (and additional information), nodes 304-8, 306-4, 308-2, and 310 (which include the key pairs associated with Hannah), and the four grey nodes that include the cryptographic summaries of the missing parts of the ratchet tree. Tree slice 340 includes leaf node 302-5 including Bob's digital certificate (and additional information), nodes 304-3, 306-2, 308-1, and 310, and three grey nodes. Redundant nodes are marked with an asterisk (*) and may not be transmitted to a client downloading the tree slices because they were previously transmitted. For example, if a client first downloads the tree slice 330 and then downloads the tree slice 340, the root node 310 may not be transmitted with tree slice 340 because the user already downloaded root node 310 with tree slice 330. The grey nodes marked with an asterisk additionally contain information that was previously downloaded and may not be transmitted again. In some embodiments, information in the nodes marked with an asterisk may be transmitted to the client even if the information in the nodes was previously transmitted to the client.

Tree slice 350 includes leaf node 302-8 that includes Diana's digital certificate (and additional information), nodes 306-2, 308-1, and 310, and a grey node. As indicated by the asterisks, nodes 306-2, 308-1, and 310 and several grey nodes were previously transmitted (in tree slice 330 or 340) and may not be transmitted with tree slice 350. Tree slice 360 includes leaf node 302-11 that includes Eric's digital certificate (and additional information), nodes 304-6, 308-2, and 310, and two grey nodes. Nodes 308-2 and 310 and two grey nodes were previously transmitted and may not be transmitted with tree slice 360.

Figure 3D:
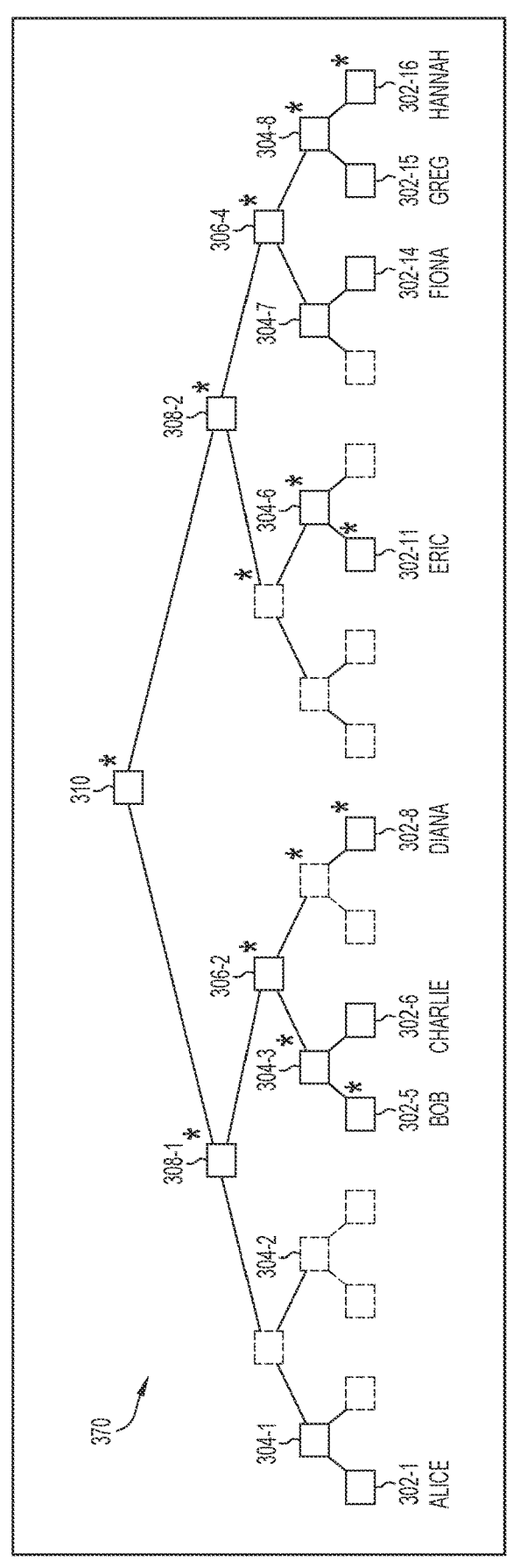
FIG. 3D illustrates the remaining incremental slice of the ratchet tree after tree slices have been transmitted, according to an example embodiment.

FIG. 3D illustrates the remaining incremental slice of the tree after tree slices 330, 340, 350, and 360 have been transmitted. Again, redundant nodes are marked with an asterisk and may not be transmitted. As illustrated in FIG. 3D, the remaining tree slice 370 includes leaf node 302-1 that includes Alice's digital certificate, leaf node 302-6 that includes Charlie's digital certificate, leaf node 302-14 that includes Fiona's digital certificate, and leaf node 302-15 that includes Greg's digital certificate, node 304-1, and node 304-7. A user may download the tree slice 370 as a single tree slice or download tree slice 370 as several tree slices incrementally by user.

Figure 4:
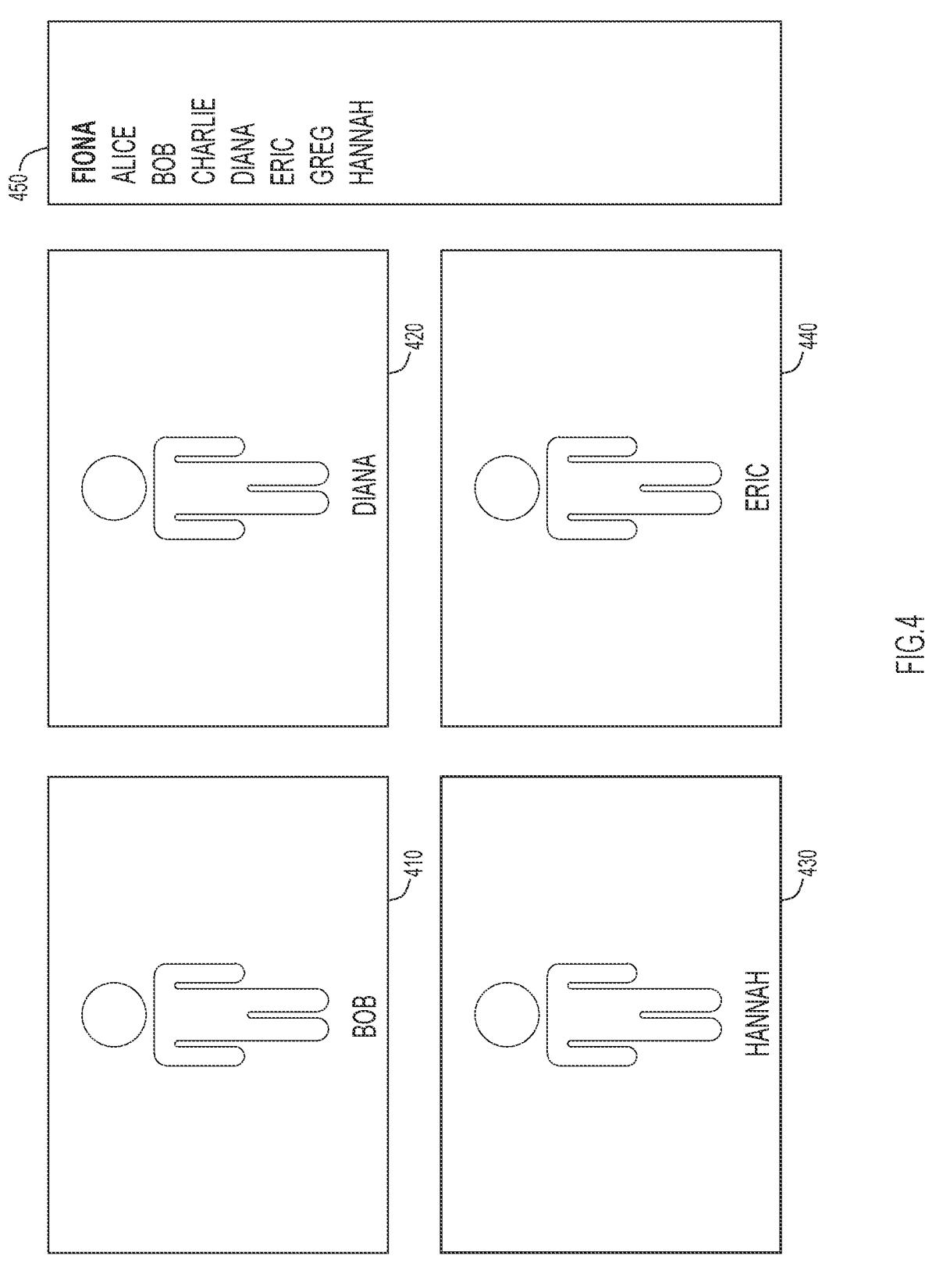
FIG. 4 illustrates a video conference scenario that would motivate the download scheme shown in FIGS. 3B-3D, according to an example embodiment.

Reference is now made to FIG. 4. FIG. 4 illustrates an example interface 400 that may be displayed on a user Fiona's screen during, for example, an E2E-secure online meeting or communication session in which a user may download the tree slices in accordance with FIGS. 3B-3D. As can be seen in interface 400, content or video feeds associated with users Bob, Diana, Hannah, and Eric are illustrated on the screen (e.g., on the stage). Content 410 is associated with Bob, content 420 is associated with Diana, content 430 is associated with Hannah, and content 440 is associated with Eric. Bob, Diana, Hannah, and Eric may all be presenting content, but, as illustrated by the bolded line around content 430, Hannah is the current speaker. Participant list 450 shows the eight participants participating in the video conference.

In this example, participant Fiona is in a video conference with seven other users, each represented by a single client. Fiona's client may use a prioritization scheme that prioritizes downloading the tree slices of active participants or speakers. In this case, Fiona's client prioritizes downloading Hannah's tree slice because Hannah is the active speaker. Fiona's client then downloads the tree slices corresponding to visible participants Bob, Diana, and Eric (e.g., as shown in FIG. 3C), and then downloads the tree slices corresponding rest of the meeting participants Alice, Charlie, and Greg.

Reference is now made to FIG. 5. FIG. 5 is a flow diagram illustrating a method 500 of authenticating a device based on obtaining a portion of authentication tree information associated with the device. Method 500 may be performed by one or more clients 110-1 to 110-N in conjunction with server(s) 130 and/or tree service 140.

At 502, a user device joins a communication session between the user device and a plurality of devices. The user device and the plurality of devices use an MLS protocol for end-to-end security. For example, a user device may join an end-to-end secure online meeting or group conversation between a plurality of participants in a group using a cloud-based application.

At 504, the user device identifies a first device of the plurality of devices. For example, the user device may identify the first device based on a prioritization scheme that indicates an order of obtaining ratchet tree information associated with participants in the group. The prioritization scheme may be based on, for example, a geolocation of the first device, membership of a first participant associated with the first device in an application-level subgroup, position of the first participant in a participant list, participation activities of the first participant in the communication session, or a role of the first participant in the communication session.

At 506, the user device obtains a portion of authentication tree information associated with the communication session. The portion is associated with the first device. For example, the user device may download a slice of a ratchet tree associated with the first device. The tree slice may include a leaf node that includes a digital certificate associated with a user of the first device, parent/ancestor nodes that include key pairs associated with the user/other users in the group, and nodes that include cryptographic summaries of other portions of the authentication tree information.

At 508, the user device may authenticate the first device based on obtaining the portion of the authentication tree information. The user device may additionally obtain additional portions of the authentication tree information until the user device obtains all of the authentication tree information.

In summary, an MLS-based E2E-secure communications provide strong security, but when the group of communicating clients is large, MLS makes it slow to join the group and expensive to keep the group state. The techniques presented herein allow clients to instantly join a group of any size, while still getting the authentication information that the application needs.

An application making use of this embodiments presented herein may sometimes have partial authentication information. In this situation the client will have authenticated some clients in the group, but not others. The application may indicate the authentication status of the client by making changes to the appearance of a client in the application, or the appearance of content sent by the client. For example, in the video conference scenario shown in FIG. 4, the application might mark the unauthenticated users Alice, Charlie, and Greg with a warning indicator, or might mark the authenticated users Bob, Diana, Eric, and Hannah with a positive indicator. As another example, if a user becomes an active speaker and a client has not yet authenticated the user, the client may be blocked from viewing/hearing content from the user until the user has been authenticated or the screen may be annotated to indicate that the user has not been authenticated. As another example, a messaging application might display indicators alongside messages indicating the sender's authentication status. If the application makes such changes, they may be reverted once the client authenticates the other user.

Figure 6:
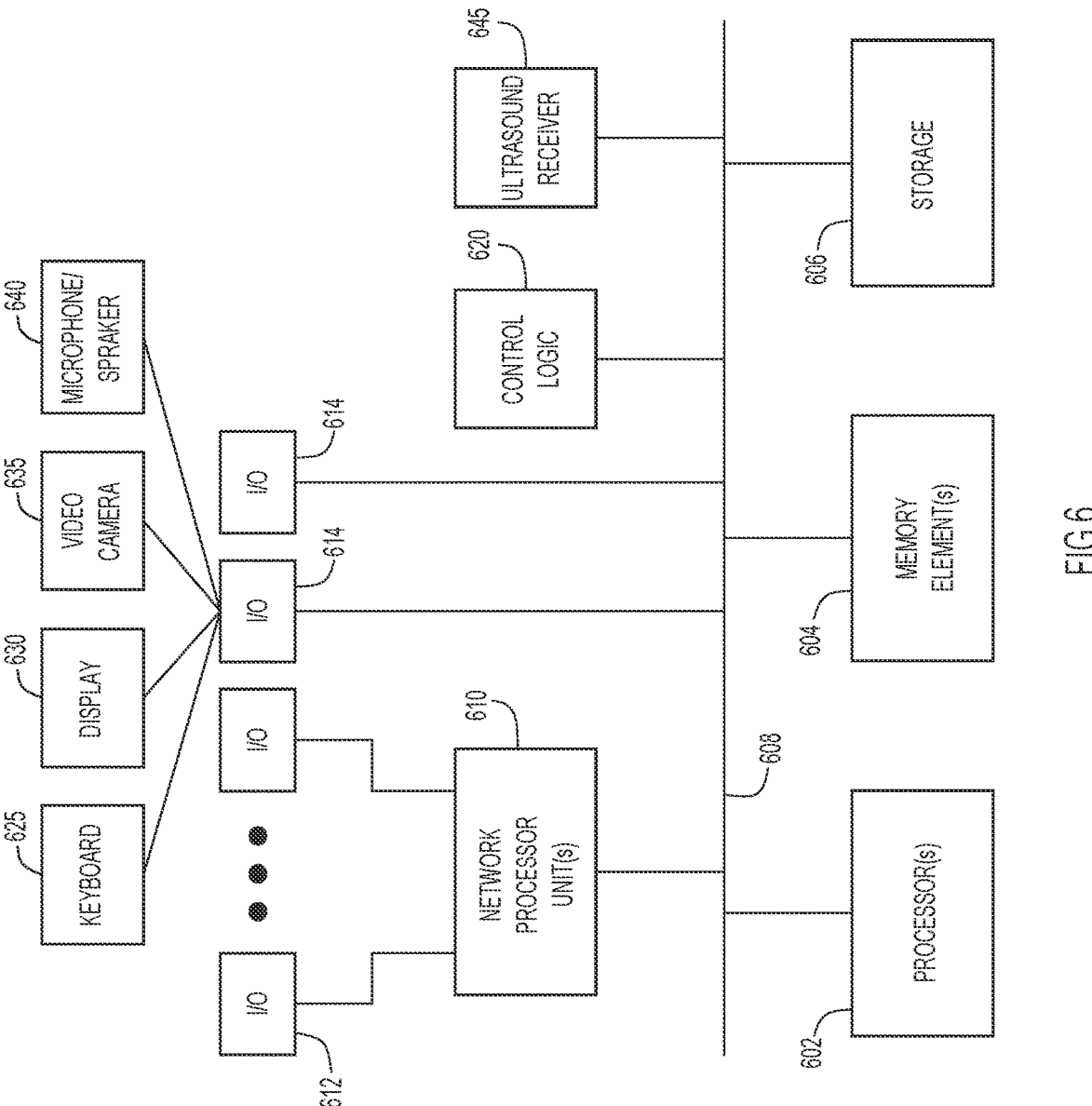
FIG. 6 is a hardware block diagram of a computer device that may be configured to perform the user device operations involved in authenticating a device based on obtaining a portion of authentication tree information associated with the device, according to an example embodiment.

Referring to FIG. 6, FIG. 6 illustrates a hardware block diagram of a computing/computer device 600 that may perform functions of a user device associated with operations discussed herein in connection with the techniques depicted in FIGS. 1, 2, 3A-3D, 4, and 5. In various embodiments, a computing device, such as computing device 600 or any combination of computing devices 600, may be configured as any devices as discussed for the techniques depicted in connection with FIGS. 1, 2, 3A-3D, 4, and 5 in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computer device 600. For example, I/O interface(s) 614 may provide a connection to external devices such as a keyboard 625, keypad, a touch screen, and/or any other suitable input and/or output device now known or hereafter developed. This may be the case, in particular, when the computer device 600 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display 630 shown in FIG. 6, particularly when the computer device 600 serves as a user device as described herein. Display 630 may have touch-screen display capabilities. Additional external devices may include a video camera 635 and microphone/speaker combination 640. In addition, the computing device 600 may further include an ultrasound transceiver 645 that may be used for the various purposes described herein.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Figure 7:
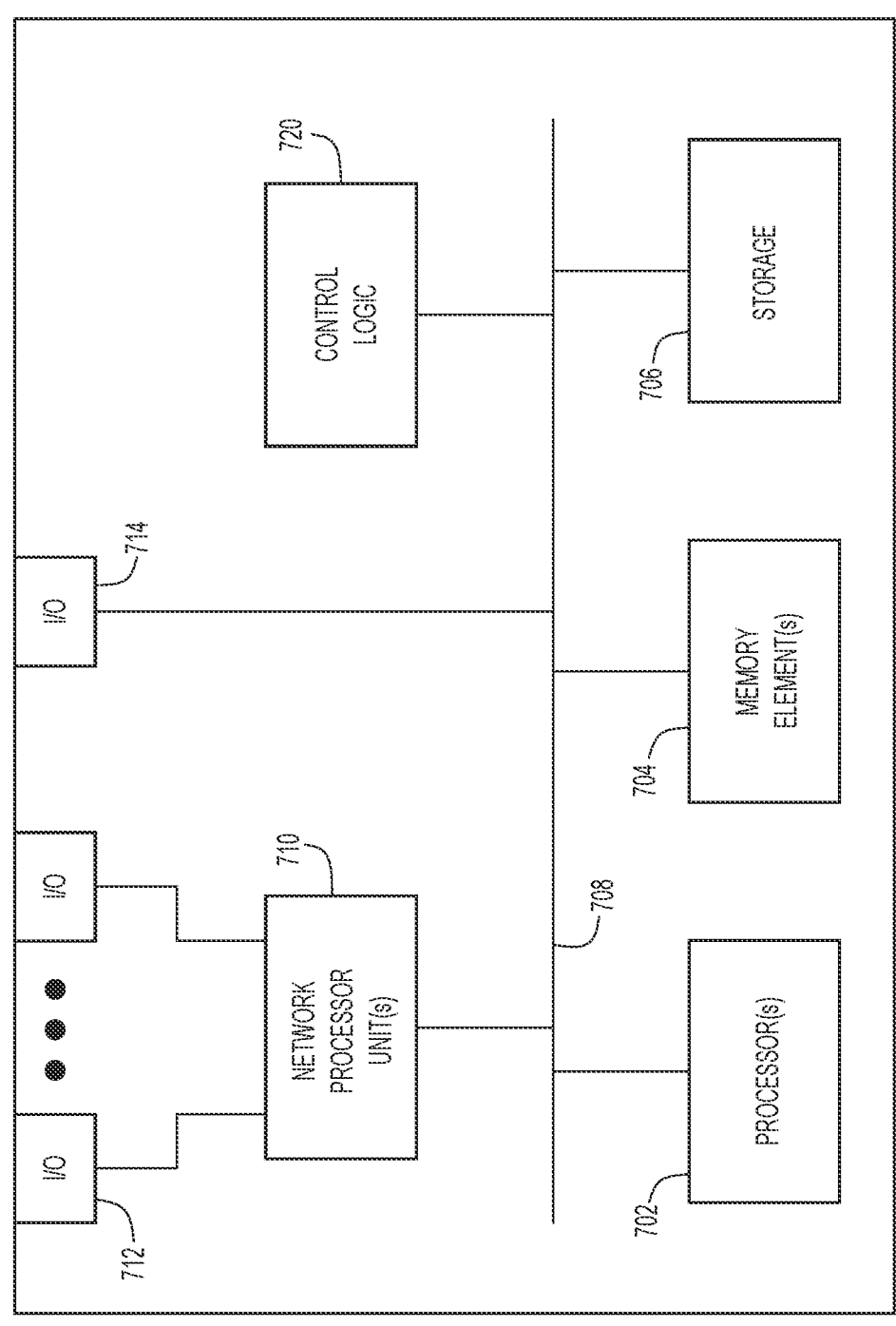
FIG. 7 is a hardware diagram of a computer device that may be configured to perform the application server operations involved in authenticating a device based on obtaining a portion of authentication tree information associated with the device, according to an example embodiment.

FIG. 7 illustrates a block diagram of a computing device 700 that may perform the functions of the server(s) 130 described herein. The computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and application server logic 720. In various embodiments, instructions associated with the application server logic 720 is configured to perform the meeting server operations described herein.

In one form, a method is provided including joining, by a user device, a communication session between the user device and a plurality of devices, the user device and the plurality of devices using a Message Layer Security (MLS) protocol for end-to-end security; identifying, by the user device, a first device of the plurality of devices; obtaining, by the user device, one or more portions of authentication tree information associated with the communication session, the one or more portions being associated with the first device; and authenticating, by the user device, the first device based on obtaining the one or more portions of the authentication tree information.

In one example, identifying the first device includes identifying the first device based on a prioritization scheme that indicates an order in which portions of the authentication tree information are obtained. In another example, the prioritization scheme is based on one of: a geolocation of the first device, membership of a first participant associated with the first device in an application-level subgroup, position of the first participant in a participant list, participation activities of the first participant in the communication session, or a role of the first participant in the communication session.

In another example, the method further includes sequentially downloading additional portions of the authentication tree information until all portions of the authentication tree information are obtained by the user device. In another example, sequentially downloading the additional portions of the authentication tree information includes downloading nodes of the additional portions of the authentication tree information that have not been previously downloaded by the user device. In another example, the one or more portions of the authentication tree information includes a slice of the authentication tree information, the slice including a node associated with the first device and a root node of the authentication tree information. In another example, joining the communication session includes joining the communication session based on an activation strategy that indicates when the user device is to become a full participant in the communication session.

In another form, a device is provided including: a memory; a network interface configured to enable network communications; and a processor, wherein the processor is configured to perform operations including: joining a communication session between the device and a plurality of devices, the device and the plurality of devices using a Message Layer Security (MLS) protocol for end-to-end security; identifying a first device of the plurality of devices; obtaining a portion of authentication tree information associated with the communication session, the portion being associated with the first device; and authenticating the first device based on obtaining the portion of the authentication tree information.

In yet another form, one or more non-transitory computer readable storage media encoded with instructions are provided that, when executed by a processor of an end device, cause the processor to execute a method including: joining a communication session between the end device and a plurality of devices, the end device and the plurality of devices using a Message Layer Security (MLS) protocol for end-to-end security; identifying a first device of the plurality of devices; obtaining a portion of authentication tree information associated with the communication session, the portion being associated with the first device; and authenticating the first device based on obtaining the portion of the authentication tree information.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 702.11 (e.g., Wi-Fi®/Wi-Fi6®), IEEE 702.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

As used herein, the terms "approximately," "generally," "substantially," and so forth, are intended to convey that the property value being described may be within a relatively small range of the property value, as those of ordinary skill would understand. For example, when a property value is described as being "approximately" equal to (or, for example, "substantially similar" to) a given value, this is intended to convey that the property value may be within +/−5%, within +/−4%, within +/−3%, within +/−2%, within +/−1%, or even closer, of the given value. Similarly, when a given feature is described as being "substantially parallel" to another feature, "generally perpendicular" to another feature, and so forth, this is intended to convey that the given feature is within +/−5%, within +/−4%, within +/−3%, within +/−2%, within +/−1%, or even closer, to having the described nature, such as being parallel to another feature, being perpendicular to another feature, and so forth. Mathematical terms, such as "parallel" and "perpendicular," should not be rigidly interpreted in a strict mathematical sense, but should instead be interpreted as one of ordinary skill in the art would interpret such terms. For example, one of ordinary skill in the art would understand that two lines that are substantially parallel to each other are parallel to a substantial degree, but may have minor deviation from exactly parallel.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    joining, by a user device, a communication session between the user device and a plurality of devices, the user device and the plurality of devices using a Message Layer Security (MLS) protocol for end-to-end security;
    identifying, by the user device, a first device of the plurality of devices based on a prioritization scheme that indicates an order in which to download individual portions of authentication tree information associated with the communication session, the order being based on information associated with participants of the communication session;
    obtaining, by the user device, one or more portions of the authentication tree information associated with the communication session, the one or more portions being associated with the first device; and
    authenticating, by the user device, the first device based on obtaining the one or more portions of the authentication tree information.

2. The method of claim 1, wherein the prioritization scheme is based on whether the participants are presenting content during the communication session.

3. The method of claim 1, wherein the prioritization scheme is based on one of: a geolocation of the first device, membership of a first participant associated with the first device in an application-level subgroup, position of the first participant in a participant list, participation activities of the first participant in the communication session, or a role of the first participant in the communication session.

4. The method of claim 1, further comprising:

sequentially downloading additional portions of the authentication tree information until all portions of the authentication tree information are obtained by the user device.

5. The method of claim 4, wherein sequentially downloading the additional portions of the authentication tree information includes downloading nodes of the additional portions of the authentication tree information that have not been previously downloaded by the user device.

6. The method of claim 1, wherein the one or more portions of the authentication tree information includes a slice of the authentication tree information, the slice including a node associated with the first device and a root node of the authentication tree information.

7. The method of claim 1, wherein joining the communication session includes joining the communication session based on an activation strategy that indicates when the user device is to become a full participant in the communication session.

8. An device comprising:

a memory;

a network interface configured to enable network communications; and a processor, wherein the processor is configured to perform operations comprising:

joining a communication session between the device and a plurality of devices, the device and the plurality of devices using a Message Layer Security (MLS) protocol for end-to-end security;

identifying a first device of the plurality of devices based on a prioritization scheme that indicates an order in which to download individual portions of authentication tree information associated with the communication session, the order being based on information associated with participants of the communication session;

obtaining a portion of the authentication tree information associated with the communication session, the portion being associated with the first device; and authenticating the first device based on obtaining the portion of the authentication tree information.

9. The device of claim 8, wherein the prioritization scheme is based on whether the participants are presenting content during the communication session.

10. The device of claim 8, wherein the prioritization scheme is based on one of: a geolocation of the first device, membership of a first participant associated with the first device in an application-level subgroup, position of the first participant in a participant list, participation activities of the first participant in the communication session, or a role of the first participant in the communication session.

11. The device of claim 8, wherein the processor is further configured to perform operations comprising:

sequentially downloading additional portions of the authentication tree information until all portions of the authentication tree information are obtained by the device.

12. The device of claim 11, wherein sequentially downloading the additional portions of the authentication tree information includes downloading nodes of the additional portions of the authentication tree information that have not been previously downloaded by the device.

13. The device of claim 8, wherein the portion of the authentication tree information includes a slice of the authentication tree information, the slice including a node associated with the first device and a root node of the authentication tree information.

14. The device of claim 8, wherein the processor is configured to perform the operation of joining the communication session by joining the communication session based on an activation strategy that indicates when the device is to become a full participant in the communication session.

15. One or more non-transitory computer readable storage media encoded with instructions that, when executed by a processor of an end device, cause the processor to execute a method comprising:

joining a communication session between the end device and a plurality of devices, the end device and the plurality of devices using a Message Layer Security (MLS) protocol for end-to-end security;

identifying a first device of the plurality of devices based on a prioritization scheme that indicates an order in which to download individual portions of authentication tree information associated with the communication session, the order being based on information associated with participants of the communication session;

obtaining a portion of authentication tree information associated with the communication session, the portion being associated with the first device; and authenticating the first device based on obtaining the portion of the authentication tree information.

16. The one or more non-transitory computer readable storage media of claim 15, wherein the prioritization scheme is based on whether the participants are presenting content during the communication session.

17. The one or more non-transitory computer readable storage media of claim 15, wherein the prioritization scheme is based on one of: a geolocation of the first device, membership of a first participant associated with the first device in an application-level subgroup, position of the first participant in a participant list, participation activities of the first participant in the communication session, or a role of the first participant in the communication session.

18. The one or more non-transitory computer readable storage media of claim 15, further comprising:

sequentially downloading additional portions of the authentication tree information until all portions of the authentication tree information are obtained by the end device.

19. The one or more non-transitory computer readable storage media of claim 18, wherein sequentially downloading the additional portions of the authentication tree information includes downloading nodes of the additional portions of the authentication tree information that have not been previously downloaded by the end device.

20. The one or more non-transitory computer readable storage media of claim 15, wherein the portion of the authentication tree information includes a slice of the authentication tree information, the slice including a node associated with the first device and a root node of the authentication tree information.

* * * * *